United States Patent
Guo et al.

(10) Patent No.: US 12,507,259 B2
(45) Date of Patent: Dec. 23, 2025

(54) SIDELINK PROCEDURE OF ENABLING RESOURCE CONFLICT AVOIDANCE IN RESOURCE ALLOCATION

(71) Applicant: QUALCOMM Incorporated, San Diego, CA (US)

(72) Inventors: Hui Guo, Beijing (CN); Kapil Gulati, Belle Mead, NJ (US); Sudhir Kumar Baghel, Pleasanton, CA (US); Tien Viet Nguyen, Bridgewater, NJ (US); Shuanshuan Wu, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 318 days.

(21) Appl. No.: 17/909,973

(22) PCT Filed: Apr. 8, 2020

(86) PCT No.: PCT/CN2020/083649
§ 371 (c)(1),
(2) Date: Sep. 7, 2022

(87) PCT Pub. No.: WO2021/203262
PCT Pub. Date: Oct. 14, 2021

(65) Prior Publication Data
US 2023/0122730 A1    Apr. 20, 2023

(51) Int. Cl.
*H04W 72/25* (2023.01)
(52) U.S. Cl.
CPC .................................. *H04W 72/25* (2023.01)

(58) Field of Classification Search
None
See application file for complete search history.

(56) References Cited

U.S. PATENT DOCUMENTS

| 2017/0142741 | A1  | 5/2017  | Kaur et al. |
| 2018/0035279 | A1* | 2/2018  | Fujishiro ........... H04W 72/0453 |
| 2019/0082459 | A1  | 3/2019  | Faurie et al. |
| 2019/0363843 | A1  | 11/2019 | Gordaychik |
| 2020/0178217 | A1* | 6/2020  | Huang ................... H04W 76/27 |
| 2020/0322024 | A1* | 10/2020 | Cheng ................... H04W 76/11 |
| 2020/0404663 | A1* | 12/2020 | Zhang ................... H04W 76/11 |

(Continued)

FOREIGN PATENT DOCUMENTS

| CN | 109076530 A   | 12/2018 |
| EP | 3372028 B1    | 2/2020  |
| WO | 2019028900 A1 | 2/2019  |

(Continued)

OTHER PUBLICATIONS

Interdigital Inc: "Open Issues on Mode 3 and Mode 4 Pool Sharing", 3GPP RAN WG2 Meeting #101bis, R2-1804821, Apr. 20, 2018 (Apr. 20, 2018), 4 Pages, section 2.

(Continued)

*Primary Examiner* — Scott M Sciacca
(74) *Attorney, Agent, or Firm* — Procopio, Cory, Hargreaves, & Savitch LLP

(57) ABSTRACT

An apparatus decodes sidelink control information to obtain resource reservation information for sidelink communication. The apparatus maintains a mapping of the resource reservation information. The apparatus reports information comprised in the mapping to a base station.

34 Claims, 10 Drawing Sheets

(56) References Cited

U.S. PATENT DOCUMENTS

2022/0007227 A1* 1/2022 Zhao .................... H04L 5/0037
2022/0140964 A1* 5/2022 Chen ...................... H04W 4/40
                                                          370/330

FOREIGN PATENT DOCUMENTS

WO        2019148376 A1    8/2019
WO    WO-2021028025 A1 *   2/2021   .............. H04W 4/40

OTHER PUBLICATIONS

International Search Report and Written Opinion—PCT/CN2020/083649—ISA/EPO—Dec. 20, 2020.
Qualcomm Incorporated: "Sidelink Resource Allocation Mechanism for NR V2X", 3GPP Draft, 3GPP TSG RAN WG1 Meeting #97, R1-1907271_Sidelink Resource Allocation Mechanism for NR V2X, 3rd Generation Partnership Project (3GPP), vol. RAN WG1, No. Reno, USA, May 13, 2019-May 17, 2019, May 3, 2019 (May 3, 2019), XP051709294, 16 pages, Retrieved from Internet: URL:http://www.3gpp.org/ftp/tsg%5Fran/WG1%5FRL1/TSGR1%5F97/Docs/R1%2D1907271%2Ezip [retrieved on May 4, 2019], section 5, section 4.
Supplementary European Search Report—EP20930371—Search Authority—The Hague—Dec. 11, 2023.

* cited by examiner

SIDELINK PROCEDURE OF ENABLING RESOURCE CONFLICT AVOIDANCE IN RESOURCE ALLOCATION

CROSS REFERENCE TO RELATED APPLICATION(S)

This application is a National Stage Application filed under 35 U.S.C. § 371 of PCT International Application Serial No. PCT/US2020/083649 entitled "SIDELINK PROCEDURE OF ENABLING RESOURCE CONFLICT AVOIDANCE IN RESOURCE ALLOCATION" and filed on Apr. 8, 2020, which is expressly incorporated by reference herein in its entirety.

BACKGROUND

Technical Field

The present disclosure relates generally to communication systems, and more particularly, to wireless communication based on sidelink.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. Aspects of wireless communication may comprise sidelink communication directly between devices, such as in vehicle-to-everything (V2X), vehicle-to-vehicle (V2V), and/or other device-to-device (D2D) communication. There exists a need for further improvements in sidelink technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). The apparatus decodes sidelink control information to obtain resource reservation information for sidelink communication. The apparatus maintains a mapping of the resource reservation information. The apparatus reports information comprised in the mapping to a base station.

In an aspect of the disclosure, a method, a computer-readable medium, and an apparatus are provided for wireless communication at a base station. The apparatus receives, from a UE, sidelink resource reservation information. The apparatus allocates the resources for sidelink communication using the sidelink resource reservation information.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
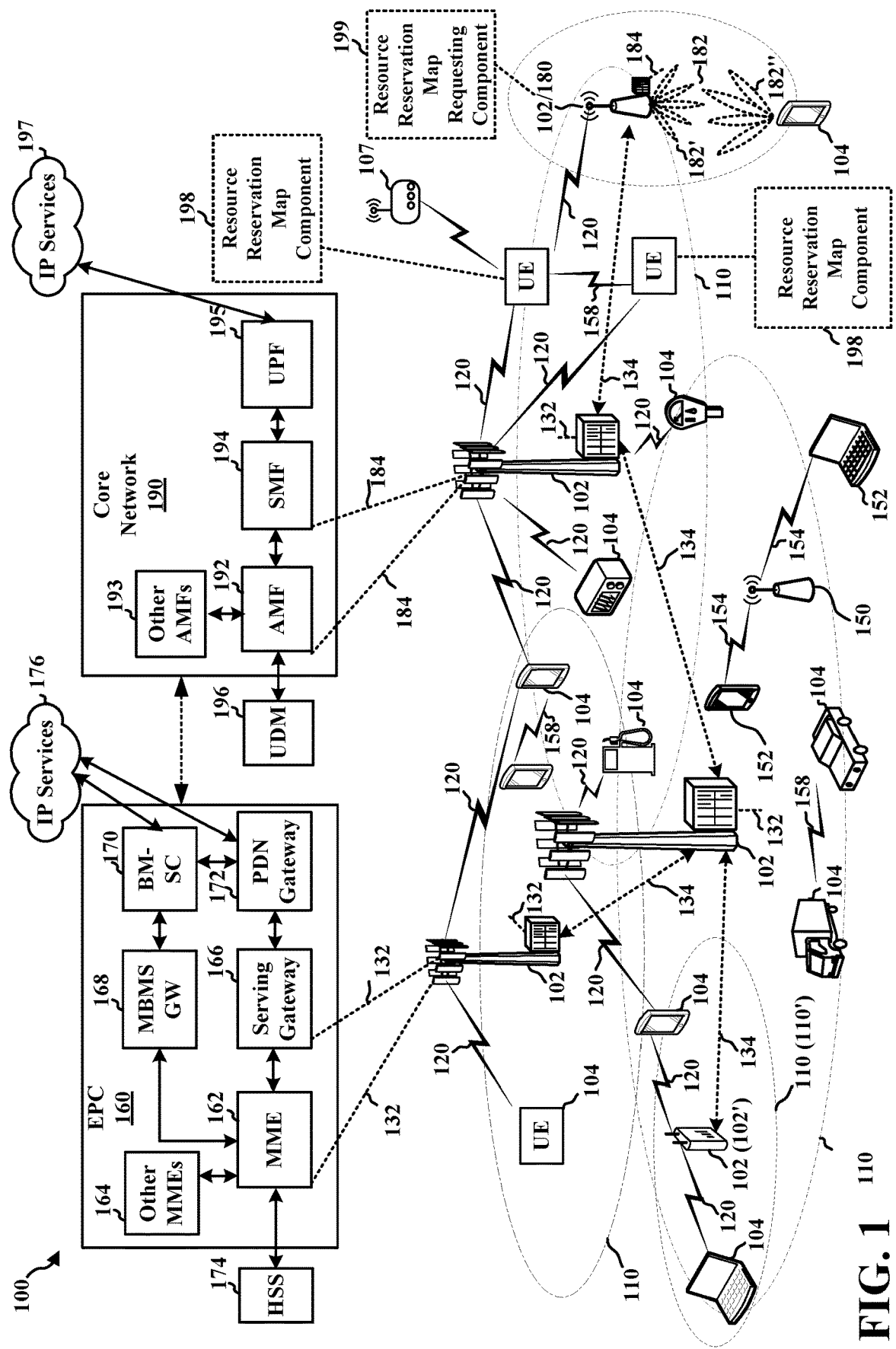
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. Some wireless communication may include communication directly between devices, such as V2X or other D2D communication. For example, some wireless communication networks may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), and/or a combination thereof and/or with. other devices, which can be collectively referred to as vehicle-to-anything (V2X) communications. Referring again to FIG. 1, in certain aspects, a UE 104, e.g., a transmitting Vehicle User Equipment (VUE) or other UE, may be configured to transmit messages directly to another UE 104. The communication may be based on V2V/V2X/V2I or other D2D communication, such as Proximity Services (ProSe), etc. Communication based on V2V, V2X, V2I, and/or D2D may also be transmitted and received by other transmitting and receiving devices, such as Road Side Unit (RSU) 107, etc. Aspects of the communication may be based on PC5 or sidelink communication e.g., as described in connection with the example in FIG. 2. Although the following description may provide examples for V2X/D2D communication in connection with 5G NR, the concepts described herein may be applicable to other similar areas, such as LTE, LTE-A, CDMA, GSM, and other wireless technologies.

As presented herein, a UE 104 may comprise a resource reservation map component 198 configured to collect and maintain a resource map (or list) related to resource allocation or reservation for one or more UEs. The resource map may include cell ID of the grant base station, resource allocation information, priority of the packet, source ID and destination ID, and/or RSRP, RSSI measurements for each resource reservation. A base station 102/180 may comprise a resource reservation map requesting component 199 configured to collect the resource map from one or more UEs. The base station 102/180 may use the reservation map to coordinate resource allocation between UEs and adjacent serving base station to reduce resource conflict.

The wireless communications system (also referred to as a wireless wide area network (WWAN)) includes base stations 102, UEs 104, an Evolved Packet Core (EPC) 160, and a Core Network (e.g., 5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., SI interface). The base stations 102 configured for NR (collectively referred to as Next Generation RAN (NG-RAN)) may interface with Core Network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or Core Network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network. A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

Devices may use beamforming to transmit and receive communication. For example, FIG. 1 illustrates that a base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly may be applied by UE 104 or RSU 107 to communicate with another UE 104 or RSU 107, such as based on V2X, V2V, or D2D communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The Core Network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the Core Network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or Core Network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
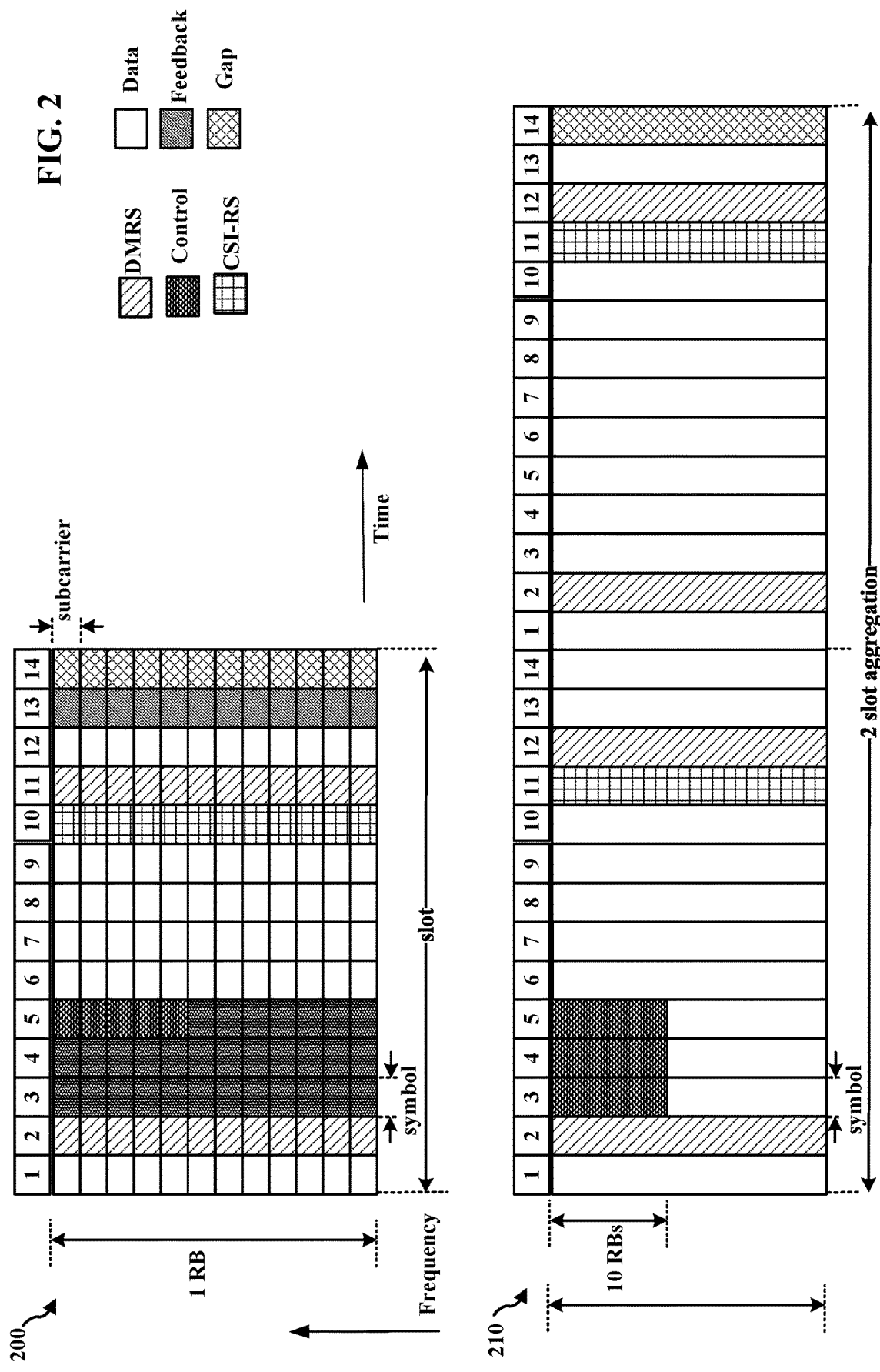
FIG. 2 illustrates example aspects of a sidelink slot structure.

FIG. 2 illustrates example diagrams 200 and 210 illustrating examples slot structures that may be used for wireless communication between UE 104 and UE 104', e.g., for sidelink communication. The slot structure may be within a 5G/NR frame structure. Although the following description may be focused on 5G NR, the concepts described herein may be applicable to other similar areas, such as LTE, LTE-A, CDMA, GSM, and other wireless technologies. This is merely one example, and other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single slot transmission, e.g., which may correspond to a 0.5 ms transmission time interval (TTI). Diagram 210 illustrates an example two-slot aggregation, e.g., an aggregation of two 0.5 ms TTIs. Diagram 200 illustrates a single RB, whereas diagram 210 illustrates N RBs. In diagram 210, 10 RBs being used for control is merely one example. The number of RBs may differ.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may comprise control information, e.g., along with demodulation RS (DMRS). FIG. 2 also illustrates that symbol(s) may comprise CSI-RS. The symbols in FIG. 2 that are indicated for DMRS or CSI-RS indicate that the symbol comprises DMRS or CSI-RS REs. Such symbols may also comprise REs that include data. For example, if a number of ports for DMRS or CSI-RS is 1 and a comb-2 pattern is used for DMRS/CSI-RS, then half of the REs may comprise the RS and the other half of the REs may comprise data. A CSI-RS resource may start at any symbol of a slot, and may occupy 1, 2, or 4 symbols depending on a configured number of ports. CSI-RS can be periodic, semi-persistent, or aperiodic (e.g., based on control information triggering). For time/frequency tracking, CSI-RS may be either periodic or aperiodic. CSI-RS may be transmitted in bursts of two or four symbols that are spread across one or two slots. The control information may comprise Sidelink Control Information (SCI). At least one symbol may be used for feedback, as described herein. A symbol prior to and/or after the feedback may be used for turnaround between reception of data and transmission of the feedback. Although symbol 12 is illustrated for data, it may instead be a gap symbol to enable turnaround for feedback in symbol 13. Another symbol, e.g., at the end of the slot may be used as a gap. The gap enables a device to switch from operating as a transmitting device to prepare to operate as a receiving device, e.g., in the following slot. Data may be transmitted in the remaining REs, as illustrated. The data may comprise the data message described herein. The position of any of the SCI, feedback, and LBT symbols may be different than the example illustrated in FIG. 2. Multiple slots may be aggregated together. FIG. 2 also illustrates an example aggregation of two slot. The aggregated number of slots may also be larger than two. When slots are aggregated, the symbols used for feedback and/or a gap symbol may be different that for a single slot. While feedback is not illustrated for the aggregated example, symbol(s) in a multiple slot aggregation may also be allocated for feedback, as illustrated in the one slot example.

Figure 3:
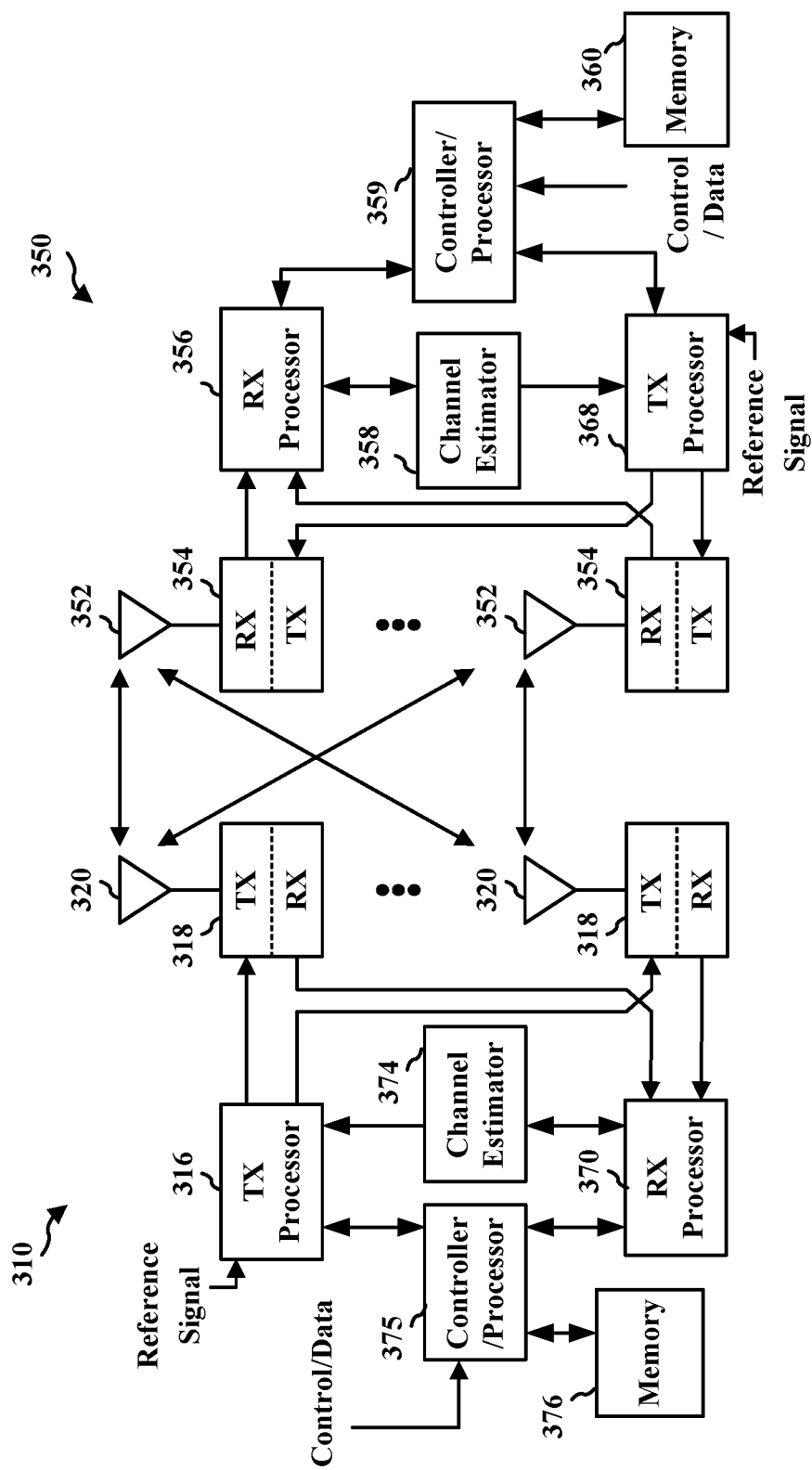
FIG. 3 is a diagram illustrating an example of a first device and a second device involved in wireless communication based, e.g., on V2V, V2X, and/or other D2D communication.

FIG. 3 is a block diagram 300 of a first wireless communication device 310 in communication with a second wireless communication device 350, e.g., via V2V/V2X/D2D communication. The device 310 may comprise a transmitting device communicating with a receiving device, e.g., device 350, via V2V/V2X/D2D communication. The communication may be based, e.g., on sidelink. In some examples, the device 310 may comprise a UE, an RSU, etc. and the device 350 may comprise a UE, an RSU, etc. In other examples, the device 310 may be a base station and the device 350 may be a UE. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

The V2X communication may become more and more important as automobile manufacturers are moving toward fully automated vehicles. V2X communication, and other D2D communication, may utilize synchronous timing for communication where V2X users use a same reference timing. Devices communicating based on V2X, or other D2D based communication, may determine radio resource (e.g., sub-channels in the frequency domain) utilization to avoid collisions with other devices.

In some V2X communication, different operation modes may be supported based on a resource allocation scheme for a direct link (e.g., D2D, sidelink transmission, etc.). For example, in one operation mode ("Mode 1"), a base station may allocate resources for sidelink communications between UEs. In another operation mode ("Mode 2"), UEs may autonomously select sidelink resources (e.g., time and frequency) for data communications between different UEs.

Figure 4:
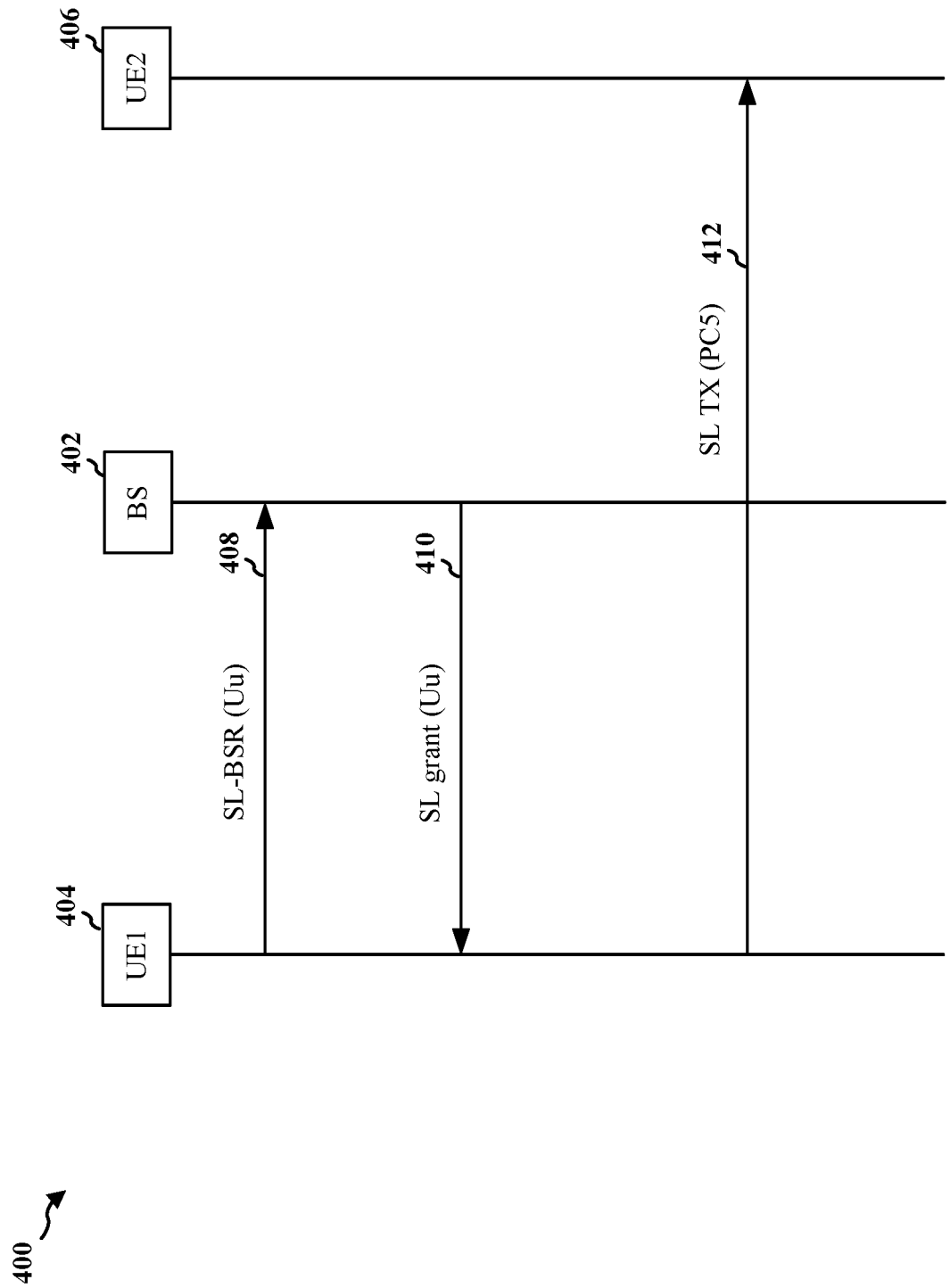
FIG. 4 is an example communication flow between a first UE, a second UE and a base station.

FIG. 4 is an example communication flow 400 illustrating a base station 402 allocating resources for sidelink communications between a first UE 404 and a second UE 406 (e.g., under Mode 1). For the first UE 404 to establish a sidelink transmission with the second UE 406, the first UE 404 may first request sidelink resource allocation and scheduling from the base station 402 as shown at 408. For example, the first UE 404 may send a sidelink-buffer status report (SL-BSR) to the base station 402 through a Uu interface. The SL-BSR may provide the base station 402 with information related to sidelink data volume of Logic Channel ID to each destination ID. In response, based on the SL-BSR, the base station 402 may schedule the sidelink resources for the first UE 404 in a sidelink grant, where the sidelink grant may be transmitted to the first UE 404 via a DCI or a RRC signaling as shown at 410. The first UE 404 may need to be RRC connected to the base station 402 in order to request the scheduling under this operation mode. Based on the sidelink grant, the first UE 404 may establish a direct sidelink transmission (e.g., through PC5 interface) with the second UE 406 using the resources granted in the sidelink grant, as shown at 412.

Figure 5:
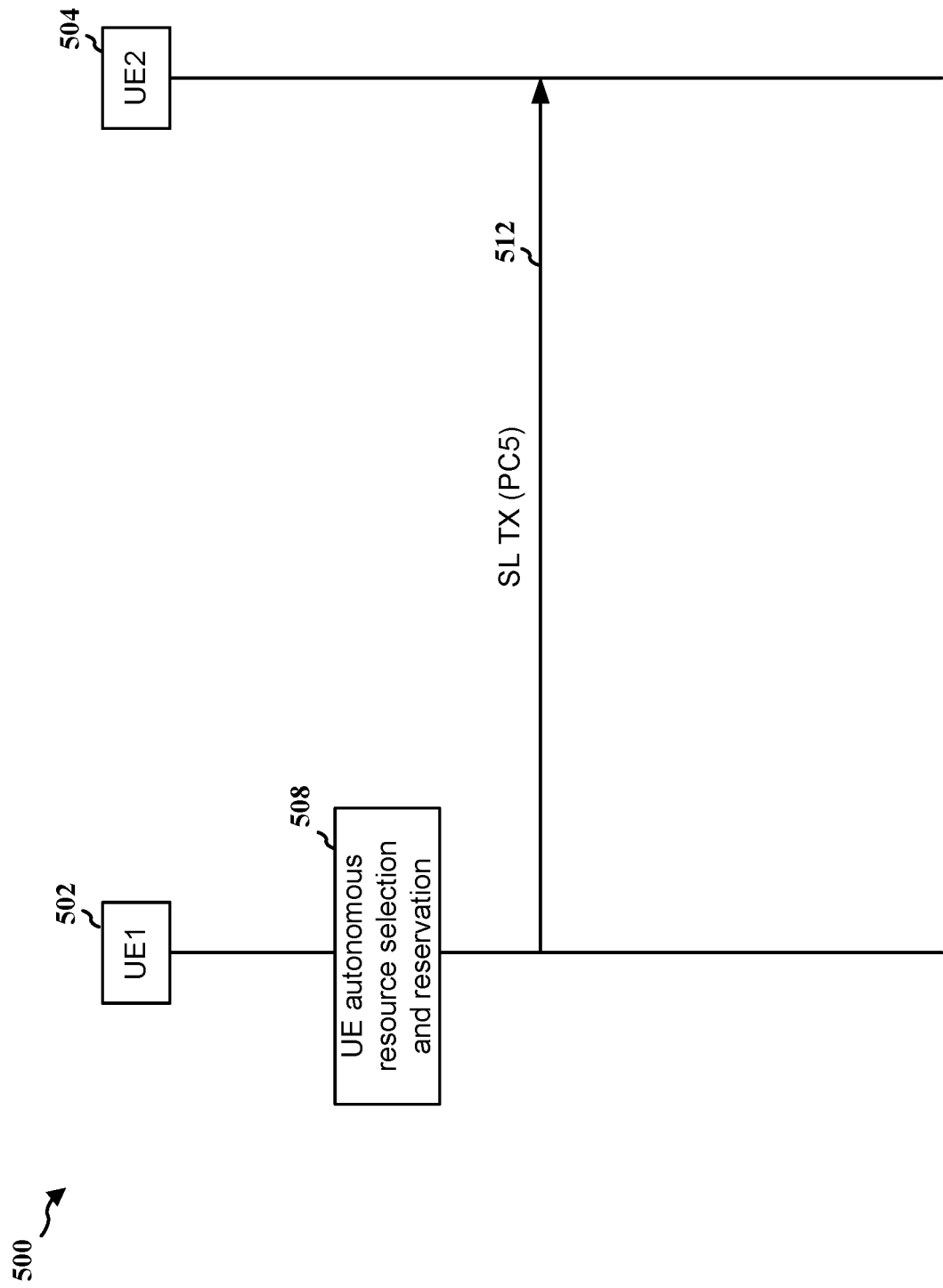
FIG. 5 is an example communication flow between a first UE and a second UE.

FIG. 5 is an example communication flow 500 illustrating a first UE 504 autonomously selects sidelink resources for transmitting data to a second UE 506. In this operation mode (e.g., Mode 2), as shown at 508, the first UE 504 may autonomously select and reserve a resource to transmit direct data and DCI from a currently available resource pool. Then the first UE 504 may use the selected sidelink resources for establishing data transmission with the second UE 506 (e.g., through PC5 interface). This operation mode may be used when the UE is RRC connected to a base station, RRC idle or out-of-network coverage.

Referring back to FIG. 4, for operation mode (e.g., Mode 1) involving the base station 402 allocating sidelink resources for the first UE 404, the base station 402 may schedule sidelink resources upon receiving the SL-BSR (e.g., at 408) from the first UE 404, yet the base station 402 may be ignorant of the intended receiving UE(s) (e.g., the second UE 406) of the corresponding transmission. Also, a receiving UE may be an intended receiver for multiple transmitting UEs, of which corresponding sidelink resource for transmitting UEs may be granted by multiple base stations. Thus, in certain circumstances, different base stations may allocate the same, or overlapping, resources for their respective transmitting UEs because different base stations may not know which UE(s) is receiving the transmission. The overlapping allocation of resources may occur more frequently when the receiving UE is not within coverage or is not connected to a base station that allocates resources for another UE. This may result in conflicting use of resources for multiple transmissions and may lead to high inter-cell interference and poor detection performance for sidelink communications.

Figure 6:
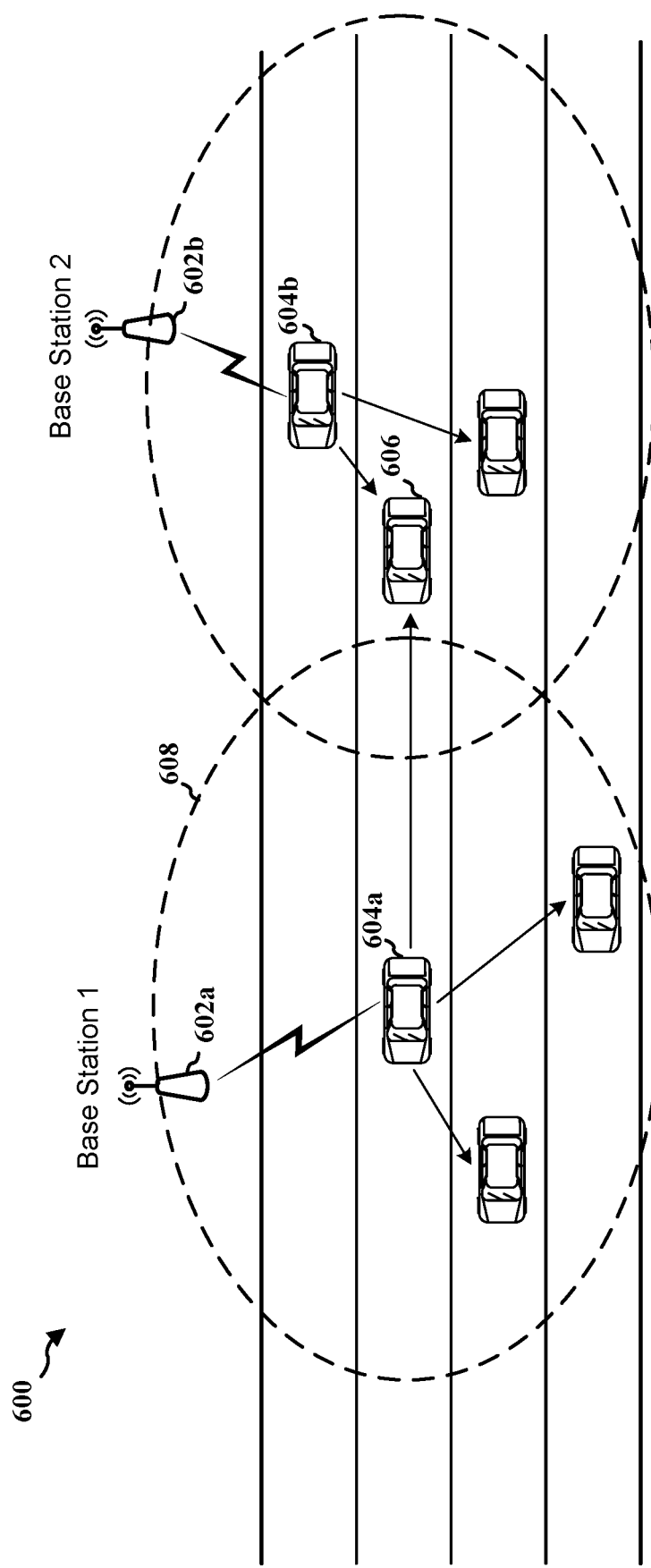
FIG. 6 is a diagram illustrating an example resource conflict.

FIG. 6 is a diagram 600 illustrating the potential for resource conflicts for the operation mode (e.g., Mode 1) described in connection with FIG. 4. In FIG. 6, a first transmitting UE 604a may request sidelink resources allocation from a first base station 602a by submitting a SL-BSR to the base station 602a. The first transmitting UE 604a may intend to use the granted sidelink resources to establish a transmission with a receiving UE 606. In response to the SL-BSR from the first transmitting UE 604a, the first base station 602a may send a sidelink grant ("first SL grant") to the first transmitting UE 604a allocating available sidelink resources for the transmission. However, as the receiving UE 606 may be in an RRC idle mode or is not within the coverage area 608 of the first base station 602a, the first base station 602a may not know that the receiving UE 606 is the intended recipient for this sidelink resources allocation. Similarly, a second transmitting UE 604b may request sidelink resources allocation from a second base station 602b by submitting a SL-BSR to the second base station 602b. The second transmitting UE 604b may also intend to use the granted sidelink resources to establish a transmission with the receiving UE 606. In response to the SL-BSR from the second transmitting UE 604b, the second base station 602b may send a sidelink grant ("second SL grant") to the second transmitting UE 604b allocating available sidelink resources for the transmission. However, as the second base station 602b may also be unaware that the receiving UE 606 is the intended recipient for this sidelink resources allocation and/or be unaware that another UE (e.g., the first transmitting UE 604a) is also sending data to the receiving UE 606, the resources scheduled by the second base station 602b in the second SL grant may, in whole or in part, overlap with the resources scheduled by the first base station 602a in the first SL grant. Thus, the first transmitting UE 604a and the second transmitting UE 604b may simultaneously transmit data to the receiving UE 606 using same resource allocation, in whole or in part, causing a resource conflict. The resource conflict may result in inter-cell interference and poor receiving performance for transmissions between transmitting UEs (e.g., 604a, 604b) and the receiving UE 606.

Aspects presented herein may improve resource coordination between UEs and adjacent serving base stations and reduce the potential resource conflict described in connection with FIG. 6. In one example, a resource information map related to resources usage and/or reservation between UEs may be maintained by each UE. Each UE may obtain and generate the reservation information map by decoding the SCI that the UE receives from other UEs. The UE may submit and/or update this reservation information map with its serving base station automatically (e.g., periodically or upon certain triggering condition) and/or upon requested by the base station. For purpose of the present disclosure, the term "map" may include any form of storing information and presenting the stored information. For example, the term "map" may also refer to, and be used interchangeably with "list" and "record" so that "resource information map" may also mean and include "resource information list" and/or "resource information record," etc.

Figure 7:
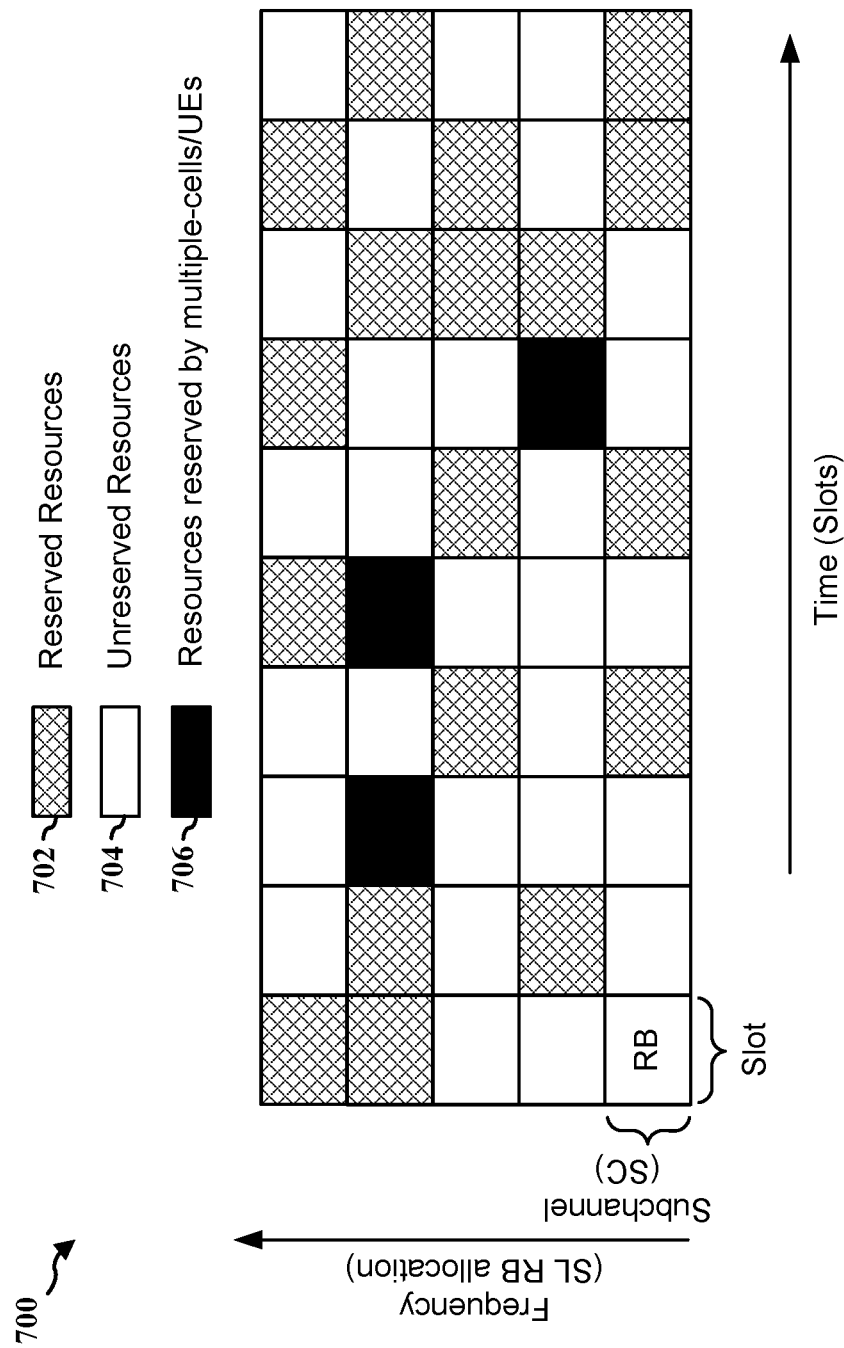
FIG. 7 is a diagram illustrating an example reservation information map.

FIG. 7 is a diagram 700 illustrating an example reservation information map that may be generated and maintained by each UE based at least in part from SCI(s) each UE receives. A UE may decode SCI received from other UEs and record the decoded information related to resource reservation in a database. In some examples, the UE may maintain information for which the UE is the intended receiver. In other examples, the UE may maintain information about resource reservation whether or not the UE is the intended receiver of a specific transmission. Thus, information related to resource reservation may include resource reservations related or not related to the UE. For example, as shown by FIG. 7, based on the SCI a UE receives from other UEs, the UE may be able to maintain a record about which time (e.g., slot) and frequency (e.g., subchannel) resources (e.g., RBs) are reserved resources 702 or unreserved resources 704. The UE may further identify and/or note RBs that are reserved by multiple cells and/or UEs 706 as these RBs are more likely to cause resource conflict (i.e., resource collision). The reserved resources 702 and 706 may relate or not relate to the UE that collects the reservation information. The UE may then store the reservation information in a database. The resource reservation information may be presented in a form of a mapping information, a list, a map, etc. to a base station. The resource reservation information may be referred to herein as combined resource reservation information, as it includes a combination of information about resources reserved by other devices.

In one example, a cell ID, which identifies the cell (e.g., 602a, 602b) that grants (or allocates) a sidelink reserved resources for a UE transmitting the SCI, may be provided in the SCI. Thus, whenever a UE decodes SCI, the receiving UE may obtain information in the SCI identifying the cell that granted the particular sidelink resource(s). When reporting the information about reserved resources to a base station, the UE may include the cell ID information for the reserved resources 702, 706 in the combined resource reservation information. Including the cell ID may help the base station receiving the resource reservation information to improve coordination of resource allocation between base stations and/or UEs. To further enhance the resources coordination, information such as resource allocation for the reserved resource, a priority associated with the reserved resource (e.g., priority of a packet to be transmitted in the reserved resource), a source ID for the reserved resource, a destination ID for the reserved resource, a signal measurement for the reserved resource (e.g., one or more of an RSRP, RSSI signal measurements) or a combination thereof may also be included for the reserved resources 702, 706 in the combined resource reservation information. The UE may then send the combined resource reservation information to its serving base station, and the base station may utilize the combined resource reservation information to determine which UE(s) and/or RB(s) are better candidates for scheduling transmission and/or which UE(s) and/or RB(s) may be avoided or cancelled (e.g., resources reserved by multiple cells/UEs 706). The UE may transmit the combined resource reservation information to the base station upon request by the base station. In another example, the UE may transmit the combined resource reservation information periodically to the base station. In another example, the UE may transmit the combined resource reservation information to the base station upon certain triggering events (e.g., when a UE is connected to a base station, etc.).

The UE may report, or the base station may request the reservation information, selectively depending on the circumstances. In one example, to provide a more comprehensive resource conflict avoidance and/or resource allocation, a base station may request all in-coverage UEs to report the combined resource reservation information to the base station, so that the base station may update or reconfigure possible conflict grant (e.g., resources reserved by multiple cells/UEs 706). In another example, a base station may selectively request certain UEs to report and/or update the combined resource reservation information, which may reduce the signaling overhead and processing effort for such reports. In another example, the base station may give cell-edge UEs a higher priority to be selected to report the reservation information map to the serving base station because cell-edge UEs may be more susceptible to inter-cell interference. The selection of cell-edge UEs may be based on an RSRP threshold. The threshold may be defined or may be indicated by the base station. The base station may indicate to a UE whether the UE is required to report the reservation information map and/or the format/reporting mode of the reservation information map in a downlink control information (DCI), e.g., different DCI formats may be provided.

In addition, for UEs which are selected by the base station to report the reservation information map, the base station and/or the UE may further determine whether to selectively report the information within the combined resource reservation information. The selective request for a report and/or selective reporting may reduce the signaling overhead and processing effort. In some examples, the UE may report the full reservation information or may report just a part of the reservation information map, etc. For example, to reduce the potential for conflicting resources to be granted by multiple base stations, a base station may request selected reporting UEs to report resource reservations (e.g., 702) granted with different cell IDs (e.g., from different base stations) in the reservation information map rather than the full reservation information map. In other examples, the UE may report resource reservations of which the UE is the intended receiver in the reservation information map to the serving base station for receiver side protection, e.g., without reporting resource reservations for which the UE is not the intended receiver. In another example, the UE may report resource reservations with high packet priority in the reservation information map to the base station to avoid or reduce resource conflict for high priority packets. For example, the UE may determine not to report resource reservations with a lower priority.

A UE may be configured to report the combined resource reservation information or not to report the reservation information. The UE may be configured to report full or partial reservation information. For example, the UE may be configured by a higher layer signaling from a serving station. In another example, the UE may be configured by SL-SCI or Uu DCI with a sidelink grant format. To alleviate the UE's processing load to generate and maintain the combined resource reservation information, a base station may select certain UEs and/or certain types of resource reservations to report and/or update the reservation information, as described above. The base station may configure or otherwise indicate to the UE to send reports via specific RRC signaling and/or DCI/SCI formats to specific UEs.

Figure 8:
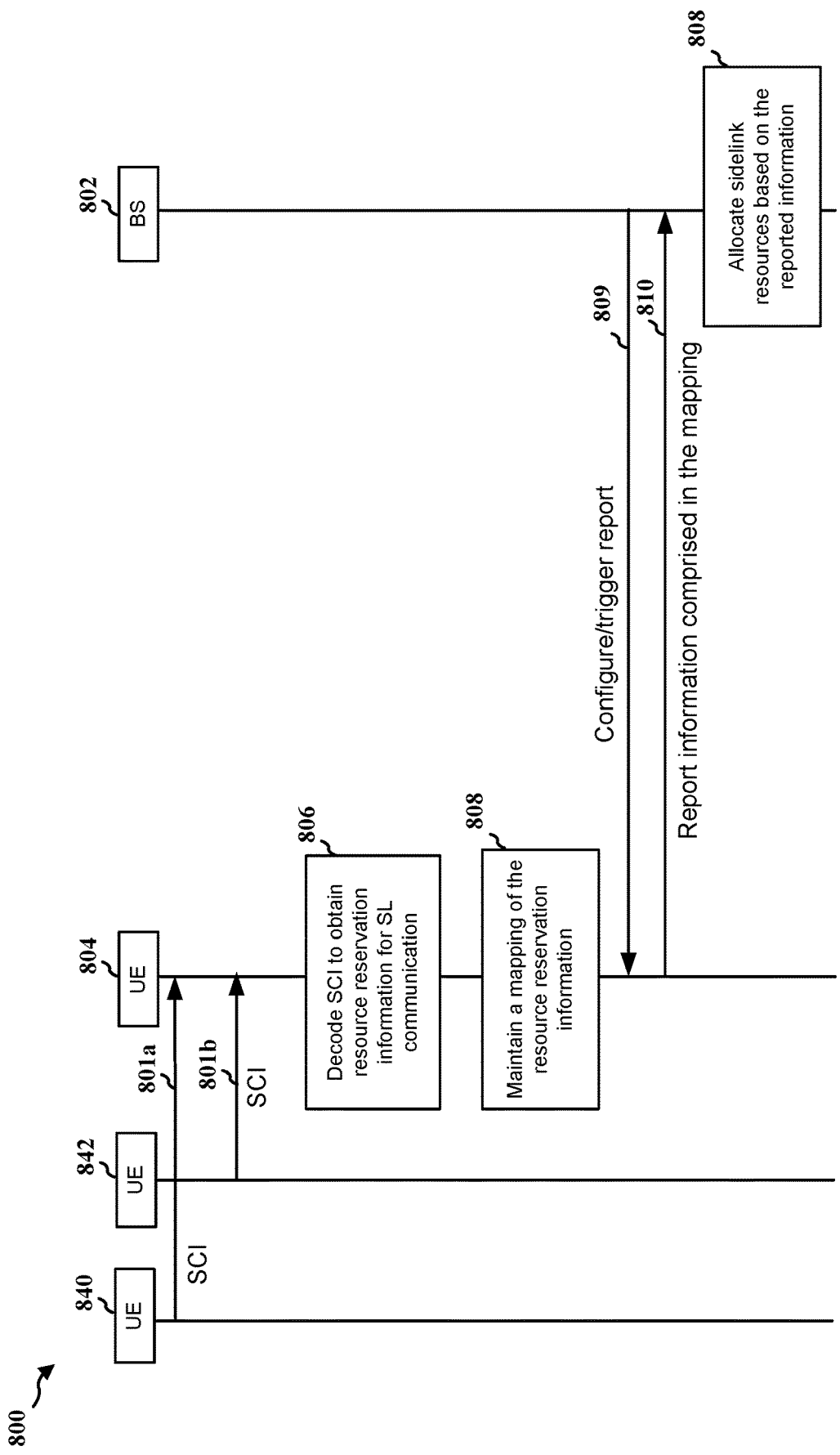
FIG. 8 is an example communication flow between a first UE and a base station.

FIG. 8 illustrates an example communication flow 800 between a UE 804 (e.g., the UE 104, 350, 404, 604a, 604b) and a base station 802. At 806, the UE 804 decodes the SCI 801a, 801b, etc. that it receives for sidelink communication from other UEs (e.g., UE 840, 842, etc.). The UE 804 obtains the resource reservation information for the sidelink communications from the SCI 801a, 801b, etc. At 808, the UE generates and maintains a mapping of the reserved resources based on the received resource reservation information in each of one or more SCI (e.g., SCI 801a, 801b, etc.), such as described in connection with FIG. 7. At 810, the UE may submit part or all information comprised in the mapping to the base station as described above. As described above, the base station 802 may configure the UE 804 for the report and/or may send a trigger to the UE 804 to provide the report, as illustrated at 809. As illustrated at 812, the base station 802 may allocate sidelink resources to the UE 804 and/or to other served UEs based on the combined resource reservation information received in the report 810. For example, the base station 802 may allocate resources that avoid the other reserved resources.

Figure 9:
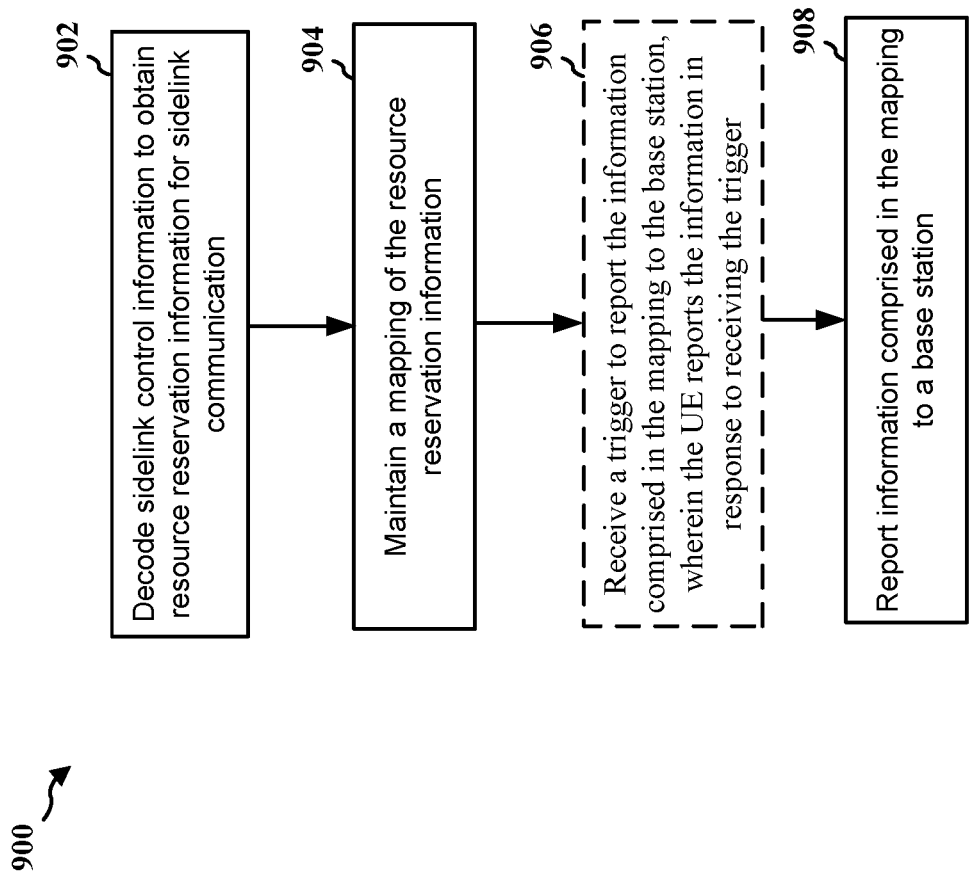
FIG. 9 is a flowchart of a method of wireless communication at a UE.

FIG. 9 is a flowchart of a method 900 of wireless communication. The method may be performed by a UE or a component of a UE (e.g., the UE 104, 350, 404, 604a, 604b, 804; the processing system, which may include the memory 360 and which may be the entire device 350 or a component of the device 350, such as the TX processor 368, the RX processor 356, and/or the controller/processor 359). Optional aspects are illustrated with a dashed line. The method may enable the UE to help avoid scheduling of conflicting resources by maintaining resource reservation information and providing the information to a base station that allocates sidelink resources.

At 902, a UE decodes sidelink control information to obtain resource reservation information for sidelink communication. The sidelink control information may comprise a cell ID of a granting base station that granted the reserved resource for the sidelink communication, such as described in connection with FIG. 7. The SCI may correspond, e.g., to 801a, 801b in FIG. 8.

At 904, the UE maintains a mapping of the resource reservation information, such as described in connection with FIG. 7. The mapping may comprise the resource reservation information received from multiple UEs. Also, the resource reservation information may include resources reserved for communication that is not directed to the UE (e.g., between other UEs). In addition, for a reserved resource, the information comprised in the mapping may further include one or more of: a cell ID of a granting base station that granted the reserved resource for the sidelink communication, resource allocation information for the reserved resource, a priority associated with the reserved resource, a source ID for the reserved resource, a destination ID for the reserved resource, or a signal measurement for the reserved resource, such as described in connection with FIG. 7.

At 906, the UE may receive a trigger to report the information comprised in the mapping to the base station, where the UE reports the information, at 908, in response to receiving the trigger. The trigger may be received over a sidelink. In an example, the trigger may be received in signaling from the base station. The trigger may comprise at least one of RRC signaling or DCI format. The DCI format may further comprise a sidelink grant format. In addition, the RRC signaling or the DCI may indicates a signal measurement threshold, where the UE may be configured to report the information comprised in the mapping based on meeting the signal measurement threshold.

At 908, the UE reports information comprised in the mapping to a base station. The UE may report all information comprised in the mapping, or just partial (e.g., selected) information comprised in the mapping depending on the system configuration and requirements. For example, the UE may report a subset of reserved resources from the mapping, where the subset of reserved resources includes one or more of: first resource reservations based on grants with a cell ID from a different base station, second resource reservations for which the UE is an intended receiver, or third resource reservations having a threshold priority level, such as described above.

Each block in the aforementioned flowchart of FIG. 9 and aspects performed by the UE 404, 604a, 604b in FIGS. 4 and 6 may be performed by at least one component of a wireless apparatus, each component being one or more hardware components specifically configured to carry out the stated processes/algorithm, implemented by a processor configured to perform the stated processes/algorithm, stored within a computer-readable medium for implementation by a processor, or some combination thereof. The components may be software components running in a processor, resident/stored in the computer readable medium/memory, one or more hardware components coupled to the processor, or some combination thereof. The processing system may be a component of the device 350 and may include the memory 360 and/or at least one of the TX processor 368, the RX processor 356, and the controller/processor 359. Alternatively, the processing system may be the entire UE (e.g., see 350 of FIG. 3).

In one configuration, an apparatus for wireless communication at UE may include means for decoding sidelink control information to obtain resource reservation information for sidelink communication; means for maintaining a mapping of the resource reservation information; and means for reporting information comprised in the mapping to a base station. The apparatus may further include means for receiving a trigger to report the information comprised in the mapping to the base station, wherein the UE reports the information in response to receiving the trigger. The aforementioned means may be one or more of the aforementioned components of the apparatus and/or the processing system of the apparatus may be configured to perform the functions recited by the aforementioned means. The processing system may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 10:
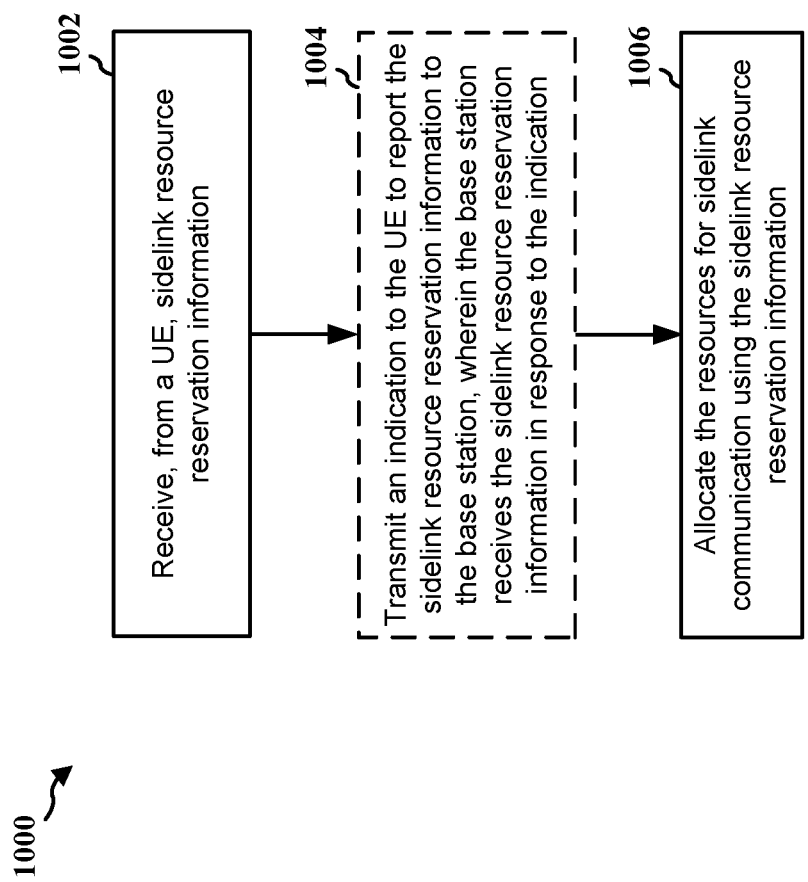
FIG. 10 is a flowchart of a method of wireless communication at a base station.

FIG. 10 is a flowchart of a method 1000 of wireless communication. The method may be performed by a base station or a component of a base station (e.g., the base station 102, 180, 310, 402, 602a, 602b, 802; the processing system, which may include the memory 376 and which may be the entire device 310 or a component of the device 310, such as the TX processor 316, the RX processor 370, and/or the controller/processor 375). Optional aspects are illustrated with a dashed line. The method may enable the base station to more effectively allocate resources for sidelink communication.

At 1002, a base station receives, from a UE, sidelink resource reservation information. The sidelink resource reservation information may comprise the sidelink resource reservation information received by the UE from multiple UEs, and may also include reserved resources for communication that is not directed to the UE. The sidelink resource reservation information may comprise various types of information. In one example, the sidelink resource reservation information includes one or more of: a cell ID of a granting base station that granted the reserved resources for the sidelink communication, resource allocation information for the reserved resources, a priority associated with the reserved resources, a source ID for the reserved resources, a destination ID for the reserved resources, or a signal measurement for the reserved resources, such as described in connection with FIG. 7. In other example, the sidelink resource reservation information may include one or more of: first resource reservations based on grants with a cell ID from a different base station, second resource reservations for which the UE is an intended receiver, or third resource reservations having a threshold priority level.

At 1004, the base station may transmit an indication to the UE to report the sidelink resource reservation information to the base station, wherein the base station receives the sidelink resource reservation information in response to the indication. For example, the indication may comprise in at least one of RRC signaling or DCI (e.g., DCI format). If the indication is comprised in a DCI format, the DCI format may further comprise a sidelink grant format. In other example, the RRC signaling or the DCI may indicate a signal measurement threshold for the UE to report the sidelink resource reservation information to the base station. The base station may indicate for all or just some of in coverage UEs to report the sidelink resource reservation information, such as described above.

At 1006, the base station allocates the resources for sidelink communication using the sidelink resource reservation information. For example, the base station may allocate resources for the sidelink communication using the sidelink resource reservation information includes avoiding allocating overlapping resources for the sidelink communication, such as described in connection with FIG. 7 and/or FIG. 8.

Each block in the aforementioned flowchart of FIG. 10 and aspects performed by the base station 402, 602a, 602b in FIGS. 4 and 6 may be performed by at least one component of a wireless apparatus, each component being one or more hardware components specifically configured to carry out the stated processes/algorithm, implemented by a processor configured to perform the stated processes/algorithm, stored within a computer-readable medium for implementation by a processor, or some combination thereof. The components may be software components running in a processor, resident/stored in the computer readable medium/memory, one or more hardware components coupled to the processor, or some combination thereof. The system may be a component of the device 310 and may include the memory 376 and/or at least one of the TX processor 316, the RX processor 370, and the controller/processor 375. Alternatively, the processing system may be the entire base station (e.g., see 310 of FIG. 3).

In one configuration, an apparatus for wireless communication at a base station may include means for receiving, from a UE, sidelink resource reservation information; and means for allocating the resources for sidelink communication using the sidelink resource reservation information. The apparatus may further include means for transmitting an indication to the UE to report the sidelink resource reservation information to the base station, wherein the base station receives the sidelink resource reservation information in response to the indication. The aforementioned means may be one or more of the aforementioned components of the apparatus and/or the processing system of the apparatus configured to perform the functions recited by the aforementioned means. As described supra, the processing system may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The following examples are illustrative only and aspects thereof may be combined with aspects of other embodiments or teaching described herein, without limitation.

Example 1 is a method of wireless communication at a user equipment (UE), comprising: decoding sidelink control information to obtain resource reservation information for sidelink communication; maintaining a mapping of the resource reservation information; and reporting information comprised in the mapping to a base station.

In Example 2, the method of Example 1 further includes that the mapping comprises the resource reservation information received from multiple UEs.

In Example 3, the method of Example 1 or Example 2 further includes that the sidelink control information comprises a cell identifier (ID) of a granting base station that granted the reserved resource for the sidelink communication.

In Example 4, the method of any of Examples 1-3 further includes that the resource reservation information includes resources reserved for communication that is not directed to the UE.

In Example 5, the method of any of Examples 1-4 further includes that for a reserved resource, the information comprised in the mapping includes one or more of: a cell identifier (ID) of a granting base station that granted the reserved resource for the sidelink communication, resource allocation information for the reserved resource, a priority associated with the reserved resource, a source ID for the reserved resource, a destination ID for the reserved resource, or a signal measurement for the reserved resource.

In Example 6, the method of any of Examples 1-5 further includes that the UE reports a subset of reserved resources from the mapping, wherein the subset of reserved resources includes one or more of: first resource reservations based on grants with a cell identifier (ID) from a different base station, second resource reservations for which the UE is an intended receiver, or third resource reservations having a threshold priority level.

In Example 7, the method of any of Examples 1-6 further comprises: receiving a trigger to report the information comprised in the mapping to the base station, wherein the UE reports the information in response to receiving the trigger.

In Example 8, the method of any of Examples 1-7 further includes that the trigger is received in signaling from the base station.

In Example 9, the method of any of Examples 1-8 further includes that the trigger comprises at least one of radio resource control (RRC) signaling or downlink control information (DCI).

In Example 10, the method of any of Examples 1-9 further includes that the trigger comprises a DCI format.

In Example 11, the method of any of Examples 1-10 further includes that the DCI format comprises a sidelink grant format.

In Example 12, the method of any of Examples 1-11 further includes that the RRC signaling or the DCI indicates a signal measurement threshold, and wherein the UE reports the information based on meeting the signal measurement threshold.

In Example 13, the method of any of Examples 1-12 further includes that the trigger is received over a sidelink.

Example 14 is a method of wireless communication at a base station, comprising: receiving, from a user equipment (UE), sidelink resource reservation information; and allocating the resources for sidelink communication using the sidelink resource reservation information.

In Example 15, the method of Example 14 further includes that allocating resources for the sidelink communication using the sidelink resource reservation information includes avoiding allocating overlapping resources for the sidelink communication.

In Example 16, the method of Example 14 or Example 15 further includes that the sidelink resource reservation information comprises the sidelink resource reservation information received by the UE from multiple UEs.

In Example 17, the method of any of Examples 14-16 further includes that the sidelink resource reservation information includes reserved resources for communication that is not directed to the UE.

In Example 18, the method of any of Examples 14-17 further includes that the sidelink resource reservation information includes one or more of: a cell identifier (ID) of a granting base station that granted the reserved resources for the sidelink communication, resource allocation information for the reserved resources, a priority associated with the reserved resources, a source ID for the reserved resources, a destination ID for the reserved resources, or a signal measurement for the reserved resources.

In Example 19, the method of any of Examples 14-18 further includes that the sidelink resource reservation information includes one or more of: first resource reservations based on grants with a cell identifier (ID) from a different base station, second resource reservations for which the UE is an intended receiver, or third resource reservations having a threshold priority level.

In Example 20, the method of any of Examples 14-19 further comprises: transmitting an indication to the UE to report the sidelink resource reservation information to the base station, wherein the base station receives the sidelink resource reservation information in response to the indication.

In Example 21, the method of any of Examples 14-20 further includes that the indication is comprised in at least one of radio resource control (RRC) signaling or downlink control information (DCI).

In Example 22, the method of any of Examples 14-21 further includes that the indication comprises a DCI format.

In Example 23, the method of any of Examples 14-22 further includes that the DCI format comprises a sidelink grant format.

In Example 24, the method of any of Examples 14-23 further includes that the RRC signaling or the DCI indicates a signal measurement threshold for the UE to report the sidelink resource reservation information to the base station.

In Example 25, the method of any of Examples 14-24 further includes that the base station indicates for in coverage UEs to report the sidelink resource reservation information.

Example 26 is a device including one or more processors and one or more memories in electronic communication with the one or more processors storing instructions executable by the one or more processors to cause the device to implement a method as in any of Examples 1-13.

Example 27 is a system or apparatus including means for implementing a method or realizing an apparatus as in any of Examples 1-13.

Example 28 is a non-transitory computer readable medium storing instructions executable by one or more processors to cause the one or more processors to implement a method as in any of Examples 1-13.

Example 29 is a device including one or more processors and one or more memories in electronic communication with the one or more processors storing instructions executable by the one or more processors to cause the device to implement a method as in any of Examples 14-25.

Example 30 is a system or apparatus including means for implementing a method or realizing an apparatus as in any of Examples 14-25.

Example 31 is a non-transitory computer readable medium storing instructions executable by one or more processors to cause the one or more processors to implement a method as in any of Examples 14-25.

Further disclosure is included in the Appendix.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
   decoding sidelink control information to obtain resource reservation information for sidelink communication;
   maintaining a mapping of the resource reservation information, wherein for a reserved resource, the mapping includes at least a cell identifier (ID) of a granting base station that granted the reserved resource for the sidelink communication, wherein the sidelink control information comprises the cell ID of the granting base station that granted the reserved resource for the sidelink communication; and
   reporting information comprised in the mapping to a base station that is not the granting base station.

2. The method of claim 1, wherein the mapping comprises the resource reservation information received from multiple UEs.

3. The method of claim 1, wherein the resource reservation information includes resources reserved for communication that is not directed to the UE.

4. The method of claim 1, wherein for the reserved resource, the mapping further includes a signal measurement for the reserved resource and at least one of a source ID for the reserved resource or a destination ID for the reserved resource.

5. The method of claim 1, further comprising:
   reporting a subset of reserved resources from the mapping, wherein the subset of reserved resources includes one or more of:
   a first resource reservation based on grants with a second cell ID from a second base station, or
   a second resource reservation for which the UE is an intended receiver.

6. The method of claim 1, further comprising:
   receiving, from the base station, a request to report the information comprised in the mapping, wherein report of the information is based on the request.

7. The method of claim 6, wherein receiving the request comprises:
   receiving the request from the base station.

8. The method of claim 7, wherein the request is received via at least one of radio resource control (RRC) signaling or downlink control information (DCI).

9. The method of claim 8, wherein the request comprises a DCI format.

10. The method of claim 8, wherein the RRC signaling or the DCI indicates a signal measurement threshold, and wherein the report of the information is based on the signal measurement threshold is met.

11. The method of claim 9, wherein the DCI format comprises a sidelink grant format.

12. The method of claim 6, wherein receiving the request comprises:
receiving the request over a sidelink.

13. A non-transitory computer-readable medium storing computer executable code for wireless communication at a user equipment (UE), the code when executed by a processor cause the processor to:
decode sidelink control information to obtain resource reservation information for sidelink communication;
maintain a mapping of the resource reservation information, wherein for a reserved resource, the mapping includes at least a cell identifier (ID) of a granting base station that granted the reserved resource for the sidelink communication, wherein the sidelink control information comprises the cell ID of the granting base station that granted the reserved resource for the sidelink communication; and
report information comprised in the mapping to a base station that is not the granting base station.

14. A method of wireless communication at a base station, comprising:
receiving, from a user equipment (UE), a mapping of resource reservation information for sidelink communication, wherein for a reserved resource, the mapping includes at least a cell identifier (ID) of a granting base station that granted the reserved resource for the sidelink communication, wherein the cell ID of the granting base station that granted the reserved resource for the sidelink communication is included in sidelink control information; and
allocating, for at least a second UE based on the resource reservation information, a set of resources for the sidelink communication.

15. The method of claim 14, wherein allocating the set of resources for the sidelink communication comprises:
avoiding allocating overlapping resources for the sidelink communication.

16. The method of claim 14, wherein the mapping includes sidelink resource reservations received by the UE from multiple other UEs.

17. The method of claim 16, wherein the mapping includes a set of reserved resources for the sidelink communication that is not directed to the UE.

18. The method of claim 16, wherein the mapping further includes a signal measurement for the reserved resource and at least one of a source ID for the reserved resource or a destination ID for the reserved resource.

19. The method of claim 14, wherein the mapping includes one or more of:
a first resource reservation based on grants with a second cell ID from a second base station, or
a second resource reservation for which the UE is an intended receiver.

20. The method of claim 14, further comprising:
transmitting, to the UE, a request to report the mapping, wherein reception of the mapping is based on the request.

21. The method of claim 20, wherein the request is transmitted via at least one of radio resource control (RRC) signaling or downlink control information (DCI).

22. The method of claim 21, wherein the request comprises a DCI format.

23. The method of claim 21, wherein the RRC signaling or the DCI indicates a signal measurement threshold for the UE to report the resource reservation information to the base station.

24. The method of claim 21, further comprising:
indicating in coverage UEs to report the resource reservation information.

25. The method of claim 22, wherein the DCI format comprises a sidelink grant format.

26. An apparatus for wireless communication at a base station, comprising:
at least one memory; and
at least one processor coupled to the at least one memory and configured to:
receive, from a user equipment (UE), a mapping of resource reservation information for sidelink communication, wherein for a reserved resource, the mapping includes at least a cell identifier (ID) of a granting base station that granted the reserved resource for the sidelink communication, wherein the cell ID of the granting base station that granted the reserved resource for the sidelink communication is included in sidelink control information; and
allocate, for at least a second UE based on the mapping, a set of resources for the sidelink communication.

27. The apparatus of claim 26, wherein the mapping includes sidelink resource reservations received by the UE from multiple other UEs.

28. The apparatus of claim 26, wherein the at least one processor is further configured to:
transmit, to the UE, a request to report the mapping, wherein reception of the mapping is based on the request.

29. An apparatus for wireless communication at a user equipment (UE), comprising:
at least one memory; and
at least one processor coupled to the at least one memory and configured to:
decode sidelink control information to obtain resource reservation information for sidelink communication;
maintain a mapping of the resource reservation information, wherein for a reserved resource, the mapping includes at least a cell identifier (ID) of a granting base station that granted the reserved resource for the sidelink communication, wherein the sidelink control information comprises the cell ID of the granting base station that granted the reserved resource for the sidelink communication; and
report the mapping of the resource reservation information to a base station that is not the granting base station.

30. The apparatus of claim 29, wherein the mapping comprises the resource reservation information received from multiple UEs.

31. The apparatus of claim 30, wherein the resource reservation information includes resources reserved for communication that is not directed to the UE.

32. The apparatus of claim 29, wherein the at least one processor is further configured to:
receive, from the base station, a request to report the mapping of the resource reservation information, wherein report of the mapping of the resource reservation information is based on the request.

33. The apparatus of claim 32, wherein to receive the request, the at least one processor is configured to:
receive the request via at least one of radio resource control (RRC) signaling or downlink control information (DCI), and wherein the RRC signaling or the DCI includes a signal measurement threshold, and wherein the mapping of the resource reservation information is reported based on the signal measurement threshold is met.

34. The apparatus of claim 32, wherein to receive the request, the at least one processor is configured to:

receive the request over a sidelink.

* * * * *